United States Patent
Kwon et al.

(10) Patent No.: US 9,766,821 B2
(45) Date of Patent: Sep. 19, 2017

(54) ACCESS CONTROLLING METHOD OF DUAL PORT MEMORY SYSTEM

(71) Applicant: LSIS CO., LTD., Anyang-si, Gyeonggi-do (KR)

(72) Inventors: Dae Hyun Kwon, Anyang-si (KR); Soo Gang Lee, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/989,734

(22) Filed: Jan. 6, 2016

(65) Prior Publication Data

US 2016/0299701 A1 Oct. 13, 2016

(30) Foreign Application Priority Data

Apr. 13, 2015 (KR) .................. 10-2015-0051999

(51) Int. Cl.
*G06F 3/06* (2006.01)
*G06F 13/16* (2006.01)
*G06F 13/42* (2006.01)

(52) U.S. Cl.
CPC .......... *G06F 3/0611* (2013.01); *G06F 3/0659* (2013.01); *G06F 3/0673* (2013.01); *G06F 13/16* (2013.01); *G06F 13/1663* (2013.01); *G06F 13/4234* (2013.01)

(58) Field of Classification Search
CPC .... G06F 3/0611; G06F 3/0673; G06F 3/0659; G06F 13/1663; G06F 13/4234; G06F 13/16
See application file for complete search history.

(56) References Cited

U.S. PATENT DOCUMENTS

| | | | |
|---|---|---|---|
| 5,379,378 A * | 1/1995 | Peters | G06F 13/4243 710/105 |
| 5,845,130 A | 12/1998 | Goff et al. | |
| 6,122,706 A | 9/2000 | Leong et al. | |
| 6,163,828 A * | 12/2000 | Landi | G06F 13/1605 710/107 |
| 2003/0023823 A1* | 1/2003 | Woo | G06F 13/4059 711/167 |

(Continued)

FOREIGN PATENT DOCUMENTS

| | | |
|---|---|---|
| EP | 0272547 | 6/1988 |
| JP | 04192192 | 7/1992 |

(Continued)

OTHER PUBLICATIONS

European Patent Office Application Serial No. 16151357.7, Search Report dated Oct. 6, 2016, 6 pages.

(Continued)

*Primary Examiner* — Rocio Del Mar Perez-Velez
(74) *Attorney, Agent, or Firm* — Lee, Hong, Degerman, Kang & Waimey

(57) ABSTRACT

An access controlling method of a dual port memory system is provided. The method includes: requesting, by a first processor, an access from a dual port memory; and transmitting, by the dual port memory, a result signal according to the access request to the first processor, wherein the result signal includes a first result signal for notifying access success, a second result signal for notifying access failure, and a third result signal for notifying access hold.

10 Claims, 8 Drawing Sheets

(56) References Cited

U.S. PATENT DOCUMENTS

2015/0234759 A1    8/2015  Tian et al.
2016/0328346 A1*  11/2016  Van Der Zande .. G06F 13/4291

FOREIGN PATENT DOCUMENTS

| JP | 0962640 | 3/1997 |
| JP | 2005242929 | 9/2005 |
| JP | 2015530679 | 10/2015 |
| KR | 10-1996-0025066 | 7/1996 |
| KR | 10-0432218 | 5/2004 |
| KR | 10-0686304 | 2/2007 |
| KR | 10-2008-0072411 | 8/2008 |
| KR | 10-1077215 | 10/2011 |
| WO | 2014053074 | 4/2014 |

OTHER PUBLICATIONS

Japan Patent Office Application Serial No. 2016-021534, Office Action dated Oct. 18, 2016, 2 pages.
Korean Intellectual Property Office Application Serial No. 10-2015-0051999, Office Action dated Jan. 15, 2016, 3 pages.
Japan Patent Office Application No. 2016-021534, Notice of Allowance dated Jan. 31, 2017, 3 pages.

* cited by examiner

ACCESS CONTROLLING METHOD OF DUAL PORT MEMORY SYSTEM

CROSS-REFERENCE TO RELATED APPLICATIONS

Pursuant to 35 U.S.C. §119(a), this application claims the benefit of earlier filing date and right of priority to Korean Patent Application No. 10-2015-0051999, filed on Apr. 13, 2015, the contents of which are all hereby incorporated by reference herein in its entirety.

BACKGROUND

The present disclosure relates to a dual port memory system, and particularly, to an access controlling method of a dual port memory system.

Recently, a mobile communication terminal such as Personal Digital Assistant (PDA) includes various additional service functions such as digital cameras, video communications, and multimedia playbacks in addition to a wireless communication function.

A mobile communication terminal may include at least one processor such as a baseband processor, an application processor, and so on in order to process wireless communication and various additional service functions and uses a dual port memory in order to reduce a data processing speed of each processor and a mounting area of a memory.

That is, when two processors use dual port memory, since each processor can read and write data in access to a memory cell array by using its port, in comparison to a case that two processor are respectively connected to different memories and exchange processing data through a Host Processor Interface (HPI), data transmission and processing speeds are faster and due to this, the overall performance of a system may be more improved.

FIG. 1 is a view illustrating a configuration of a dual port memory system according to the related art and FIG. 2 is a timing diagram illustrating the dual port memory system of FIG. 2.

Referring to FIG. 1, the dual port memory system includes a dual port memory 1, a first processor 2, and a second processor 3.

The dual port memory 1 may be Synchronous Dynamic Random Access Memory (SDRAM).

Herein, when the dual port memory 1 is applied to a mobile communication terminal, the first processor 2 may operate as a baseband processor and the second processor 3 may operate as an application.

The baseband processor in a mobile communication terminal may perform a communication function and control operations of application processors for performing a specific function (for example, multimedia playback, a camera function, and so on). Additionally, the baseband processor may control operations of additional devices (for example, a display unit, an external storage device, and so on) provided in a mobile communication terminal.

The first processor 2 may read and write data on the dual port memory 1 through a first external bus interface (not shown) and the second processor 3 may read and write data on the dual port memory 1 through a second external bus interface (not shown).

Each of the first processor 2 and the second processor 3 exchanges clock signal CLK, chip selection signal CS, address signal, data signal Data, write signal WR, and access request result signal (for example, Busy) with the dual port memory 1.

At this point, when attempting to access the dual port memory 1, the first processor 2 and the second processor 3 request an access from the dual port memory 1.

Herein, when there is an access request from the first processor 2 or the second processor 3, the dual port memory 1 determines whether there is an access of the current another processor and output the access request result signal according to the access.

That is, when the current another processor accesses the dual port memory 1 already, the dual port memory 1 outputs a busy signal as the access request result signal to notify an access failure to a processor that requests the access. At this point, the busy signal has an active low form and when an access failure is notified according thereto as mentioned above, a low signal LOW is outputted as an access request result signal as shown in FIG. 2.

Additionally, when the current another processor does not access currently, the dual port memory 1 allows an access of a processor that requests the access.

In relation to a method of accessing the dual port memory 1 according to the related art, at the time that the first processor 2 attempts to access the dual port memory 1, if the second accesses the dual port memory 1 already, the dual port memory 1 outputs a busy signal Busy to the first processor 2 to notify an access failure to the first processor 2.

However, according to the above-mentioned related art access method, since a busy signal for notifying an access failure is checked and according thereto, an access is required to be requested to the dual port memory 1 later in an application level when an access to the dual port memory 1 is failed, it takes a long time until the access is retried.

SUMMARY

Embodiments provide an access method of a new type dual port memory system.

Embodiments also provide an access method of a dual port memory system to allow an optimized access as drastically reducing an access retrial time by adding a time-out function and a hold function.

In one embodiment, an apparatus (or method) includes:~

In another embodiment, an access controlling method of a dual port memory system is provided. The method includes: requesting, by a first processor, an access from a dual port memory; and transmitting, by the dual port memory, a result signal according to the access request to the first processor, wherein the result signal includes a first result signal for notifying access success, a second result signal for notifying access failure, and a third result signal for notifying access hold.

The transmitting of the result signal may include: checking an access state of a second processor; when the second processor is not in access, transmitting the first result signal to the first processor; when the second processor is in access, checking whether a predetermined allowance time elapses; if the predetermined allowance time elapses, transmitting the second result signal to the first processor; and if the predetermined allowance time does not elapse, transmitting the third result signal to the first processor.

When the third result signal is transmitted to the first processor, the dual port memory may check whether the access of the second processor is terminated and according to the whether the access of the second processor is terminated, re-transmit the result signal to the first processor.

When the access of the second processor is terminated before the allowance time elapses, the dual port memory may re-transmit the first result signal to the first processor.

When the third result signal is received, the processor may wait to receive a result signal re-transmitted from the dual port memory before a predetermined allowance time elapses.

When the third result signal is received and the predetermined allowance time elapses, the first processor may recognize the received third result signal as an access failure corresponding to the second result signal.

The first to third result signals may be determined by high and low states of a first signal and a second signal transmitted from the dual port memory to the first processor.

In further another embodiment, an access controlling method of a dual port memory system provided. The method includes: requesting, by a first processor, an access from a dual port memory; checking, by the dual port memory, an access state of a second processor; when the second processor is not in access, allowing the access of the first processor; and when the second processor is in access, transmitting, by the dual port memory, a busy signal for notifying access rejection to the first processor, wherein the busy signal is used as a signal for notifying access standby before a predetermined first allowance time elapses on the basis of the predetermined first allowance time and used as a signal for notifying access failure after the predetermined first allowance time elapses.

The dual port memory may check whether the access of the second processor is terminated when the busy signal transmitted to the first processor is a signal for notifying access standby, allow the access of the first processor when the access of the second process is terminated, and re-transmit a busy signal according to whether the predetermined first allowance time elapses when the access of the second processor is not terminated.

When the busy signal for notifying the access standby is received, until a predetermined second allowance time elapses, the first processor may wait to receive an access result signal re-transmitted from the dual port memory.

The first allowance time may be a time set in the dual port memory and the second allowance time may be a time set in the first processor.

The details of one or more embodiments are set forth in the accompanying drawings and the description below. Other features will be apparent from the description and drawings, and from the claims.

DETAILED DESCRIPTION OF THE EMBODIMENTS

Figure 1:
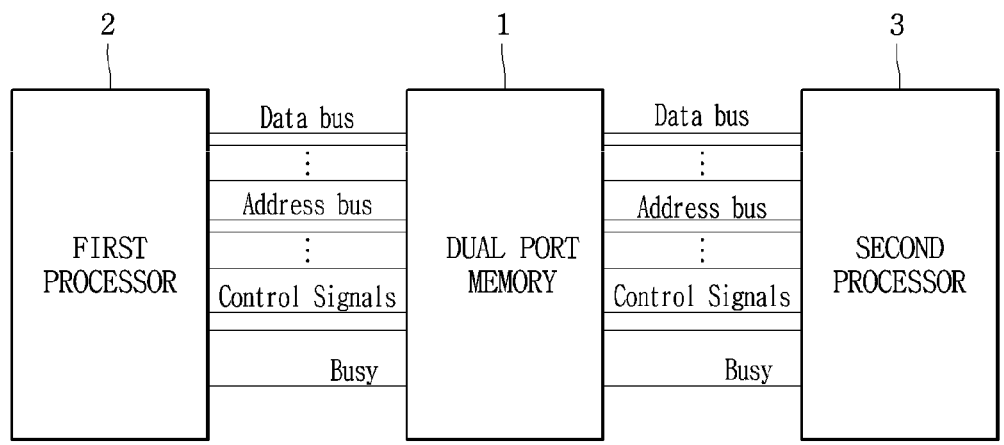
FIG. 1 is a view illustrating a configuration of a dual port memory system according to the related art.
Figure 2:
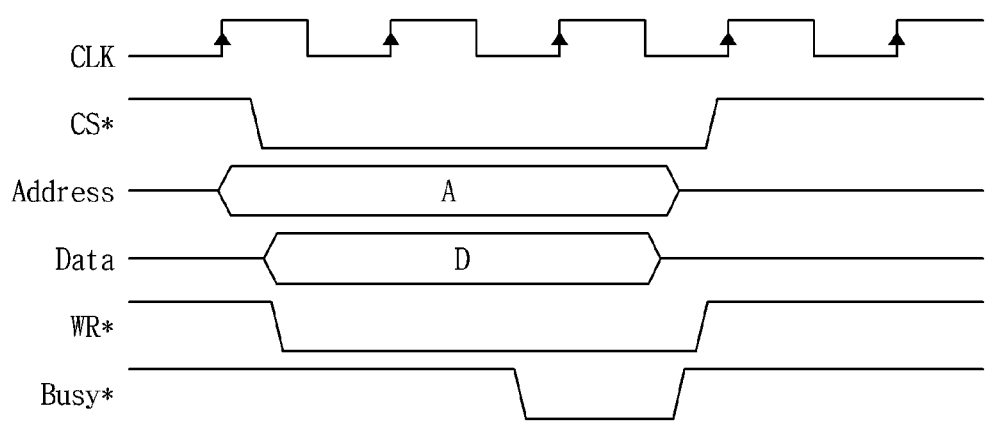
FIG. 2 is an access timing diagram illustrating the dual port memory system of FIG. 1.

Some embodiments are described below in more detail with reference to the accompanying drawings. In the following description, since the suffixes "module" and "unit" for components are given and interchanged for easiness in making the present disclosure, they do not have distinct meanings or functions.

The effects and features of the inventive concept, and implementation methods thereof will be clarified through following embodiments described with reference to the accompanying drawings. An embodiment may, however, be embodied in different forms and the inventive concept should not be construed as limited to the embodiments set forth herein. Rather, these embodiments are provided to make this disclosure thorough and complete and fully convey the scope of the inventive concept to a person skilled in the art. Further, the inventive concept is only defined by scopes of claims. The same reference numerals throughout the disclosure refer to the same components.

When describing embodiments, detailed descriptions related to known functions or configurations will be ruled out in order not to unnecessarily obscure subject matters of the embodiments. In addition, since the terms used herein are defined in consideration of functions in the embodiments, they may vary depending on a user's, operator's intention or practice. Therefore, the definitions need to be made based on details throughout the inventive concept.

Combinations of each block of the accompanying drawings and each step of a flowchart may also be performed by computer program instructions. Since the computer program instructions may be loaded on the processor of a general-purpose computer, a special-purpose computer or other programmable data processing equipment, the instructions performed by the processor of the computer or other programmable data processing equipment create a means that performs functions described on each block of a drawing or each step of a flowchart. Since the computer program instructions may also be stored in a computer usable or computer readable memory that may aim at the computer or other programmable data processing equipment in order to implement functions in a specific manner, the instructions stored in the computer usable or computer readable memory may also produce an item that includes an instruction means performing functions described on each block of a drawing or each step of a flowchart. The computer program instructions may also be loaded on the computer or other programmable data processing equipment. Thus, since a series of operation steps are performed on the computer or other programmable data processing equipment to create processes executed by a computer, instructions operating the computer or other programmable data processing equipment may also provide steps for performing functions described on each block of a drawing and each step of a flowchart.

Also, each block or each step may represent a portion of a module, a segment or a code that includes one or more executable instructions for performing specific logical function(s). Also, it should be noted that some alternatives may be performed in such a way that functions mentioned at blocks or steps are performed in a different order. For example, two blocks or steps shown one after another may also be performed substantially at the same time or the blocks or steps may also be sometimes performed in a reverse order according to a corresponding function.

Reference will now be made in detail to the embodiments of the present disclosure, examples of which are illustrated in the accompanying drawings.

Figure 3:
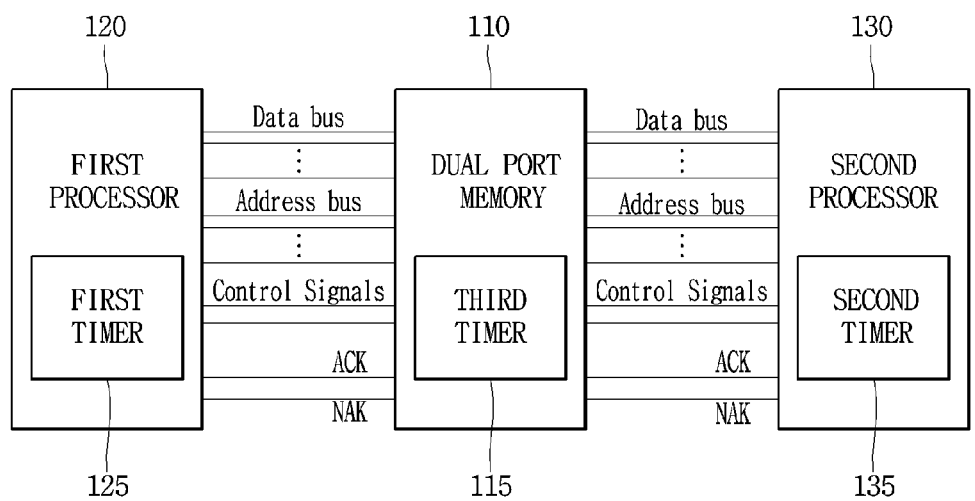
FIG. 3 is a view illustrating a configuration of a dual port memory system according to a first embodiment of the present invention.
Figure 4:
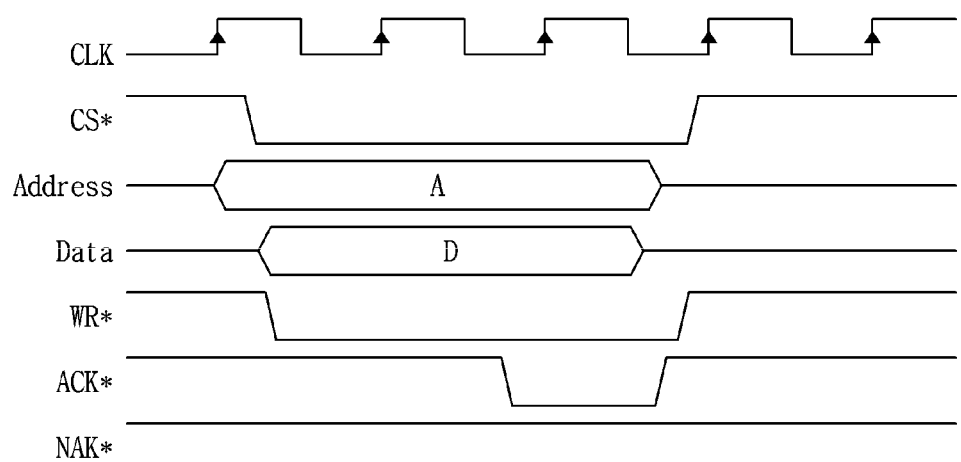
FIGS. 4, 5, and 6 are state specific access timing diagrams illustrating a dual port memory system according to an embodiment of the present invention.
Figure 5:
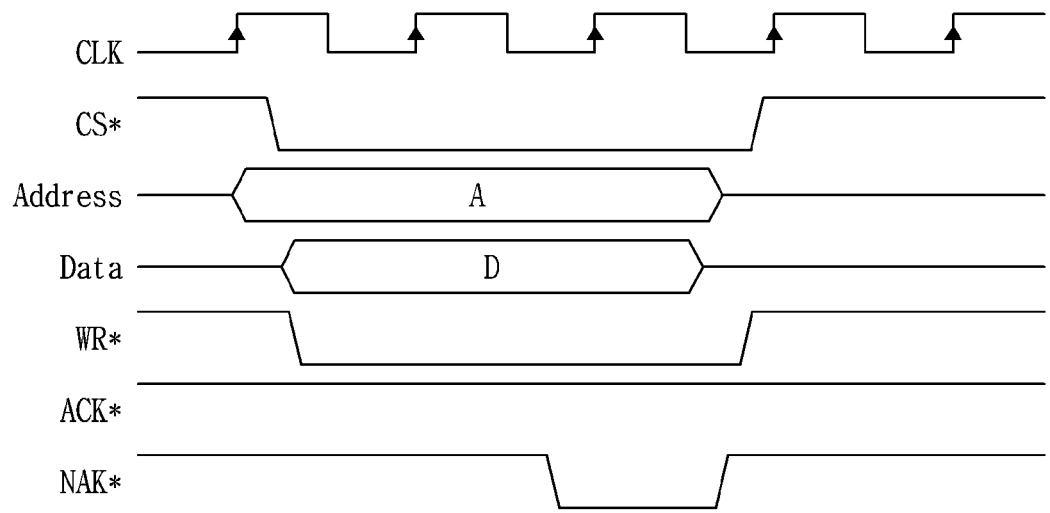
Figure 6:
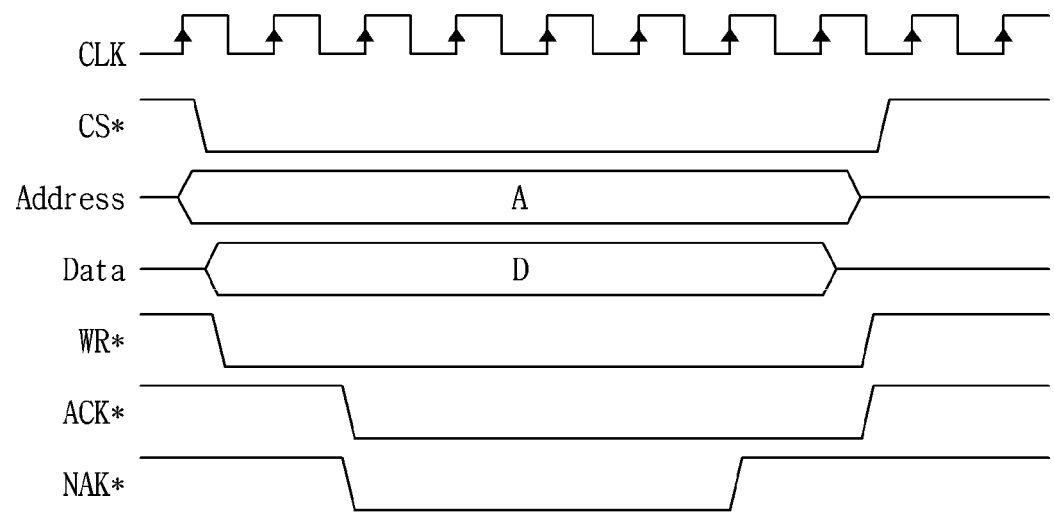

FIG. 3 is a view illustrating a configuration of a dual port memory system according to a first embodiment of the present invention and FIGS. 4 to 6 are state specific access timing diagrams of a dual port memory system.

Referring to FIG. 3, the dual port memory system includes a dual port memory 110, a first processor 120, and a second processor 130.

The first processor 120 accesses the dual port memory 110 through a first port (not shown) and the second processor 130 accesses the dual port memory 110 through a second port (not shown).

The first processor 120, for example, may be configured with a baseband processor of a mobile communication terminal.

The second processor 130, for example, may be configured with an application processor of a mobile communication terminal.

The dual port memory 110 is connected to the first processor 120 through the first port and connected to the second processor 130 through the second port.

Additionally, the dual port memory 110 may include a memory interface (not shown) and a memory area (not shown).

Each memory interface may be configured with an SDRAM or PSRAM interface and may include a command decoder, a row decoder, a column decoder, and an input/output buffer.

The each memory interface receives addresses, control signals, clocks, and data through each corresponding port, determines a memory area to perform a read or write operation by decoding an address as a row address and a column address, and read or write data from or on a predetermined memory area according to an operation timing such as read, write, and refresh on the predetermined memory area.

The dual port memory 110 may be divided into a dedicated memory area and a common memory area. The dedicated memory area is a memory area that the first processor 120 and the second processor 130 access through the first port and the second port and guarantees an exclusive access to prevent the access conflict of the first processor 120 and the second processor 130.

The common memory area is an area that the first processor 120 and the second processor 130 access commonly to read or write data.

The memory area may have a unit memory cell structure of DRAM and may be configured with a predetermined bank unit. Alternatively, each memory area may be configured with a block unit having a predetermined size in one bank.

A first memory interface (not shown) of the dual port memory 110 may be configured with a Synchronous DRAM (SDRAM) memory interface. Accordingly, the first memory interface of the dual port memory 110 receives addresses, control signals, clocks CLK, and data from the first processor 120 through the first port and after decoding an address as a row address and a column address according thereto, read or write data from or on a memory area according to an operation timing such as read, write, and refresh of the memory area on the basis of the decoded address.

For this, the first memory interface may include a command decoder (not shown), a row decoder (not shown), a column decoder (not shown), and an input/output buffer (not shown), which are used for general SDRAM.

Additionally, a second memory interface (not shown) of the dual port memory 110 is configured with an SDRAM memory interface and is connected to the second processor 130 through the second port so that it receives addresses, control signals, clocks, and data from the second processor 130.

Additionally, after decoding the inputted address as a row address and a column address, the second memory interface of the dual port memory 110 read or write data from or on a memory area according to an operation timing such as read, write, and refresh of the memory area on the basis of the decoded address.

For this, the second memory interface may include a command decoder (not shown), a row decoder (not shown), a column decoder (not shown), and an input/output buffer (not shown), which are used for a general SDRAM interface.

On the other hand, when there is an access request from the first processor 120 or the second processor 130, the dual port memory 110 check whether the memory area of the dual port memory 110 is used through the current another processor.

On the other hand, the dual port memory 110 outputs an access result signal according to the access request to a processor that requests the access according to whether the memory area is used.

At this point, the dual port memory 110 divides an access result signal according to the access request into a first result signal, a second result signal, and a third result signal and according thereto, outputs one of them as a result signal according to the access request.

The first result signal is a signal for notifying access success, the second result signal is a signal for notifying access failure, and the third result signal is a signal for notifying access hold.

At this point, in general, the dual port memory 110 outputs high signal or low signal through one signal line to output the result signal. That is, the access result signal is a signal in low active form. Accordingly, when the signal is low, it notifies access failure and when the signal is high, it notifies access success.

However, according to the first embodiment of the present disclosure, the access result signal is outputted through two signal lines so that each of the access success signal, the access failure signal, and the access hold signal may be outputted by combining the two signals.

At this point, the access hold signal is determined by a predetermined allowance time.

For this, the dual port memory 110 includes a third timer 115.

The third timer 115 outputs one of the first result signal, the second result signal, and the third result signal to a processor that requests the access according to a predetermined allowance time.

Hereinafter, a processor that requests an access is referred to as a first processor and described. However, this is just one embodiment and an operation performed by the first processor may be identically performed by a second processor.

As access is required, the first processor 120 transmits an access request signal to the dual port memory 110.

The dual port memory 110 determines whether the current second processor 130 is in access according to the access request signal.

Then, if the second processor 130 is not in access, the dual port memory 110 outputs a first result signal for notifying access success to the first processor 120.

On the other hand, if the second processor 130 is in access, the dual port memory 110 checks whether a predetermined allowance time elapses from a time point that the first processor 120 requests access through the third timer 115 and outputs the second result signal for notifying access failure or the third result signal for notifying access hold according to whether the allowance time elapses.

Then, if the predetermined allowance time elapses from the time point that the first processor 120 requests the access, the dual port memory 110 outputs the second result signal for notifying the access failure according thereto to the first processor 120 and requests access again later.

Additionally, if the predetermined allowance time does not elapse from the time point that the first processor 120 requests the access, the dual port memory 110 outputs the third result signal for notifying the access hold to the first processor 120.

The access hold is for maintaining the access request for the requested time when the dual port memory 110 and the first processor 120 are connected to each other.

Additionally, while outputting the third result signal, the dual port memory 110 checks whether the access of the second processor 130 is terminated before the requested time elapses and if the access of the second processor 130 is terminated, outputs the first result signal for notifying the access success to the first processor 120.

Accordingly, in this embodiment, by adding the access hold function to continuously maintaining a state of requesting the access for a predetermined allowance time, inconvenience in attempting an additional access request may be prevented.

On the other hand, the result signal is determined by states of an ACK signal and a NAK signal.

Referring to FIG. 4, it is shown that the ACK signal is in low state and the NAK signal is in high state. That is, the ACK signal and the NAK signal may have an active low form.

Accordingly, the signal of FIG. 4 notifies that the ACK signal is in activation and this is used as a signal for notifying access success representing a positive according to the access request.

Additionally, referring to FIG. 5, it is shown that the ACK signal is in high state and the NAK signal is in low state.

Accordingly, the signal of FIG. 5 notifies that the NAK signal is in activation and this is used as a signal for notifying access failure representing a negative according to the access request.

Additionally, referring to FIG. 6, it is shown that both the ACK signal and the NAK signal are in low state. Accordingly, the signal of FIG. 6 notifies that both the ACK signal and the NAK signal are in activation and this is used as an access hold signal representing both a positive and a negative according to the access request.

On the other hand, the first processor 120 receives a result signal transmitted from the dual port memory 110 and when the result signal is a first result signal, accesses the dual port memory 110 normally to perform a data read or write operation.

Additionally, when a result signal transmitted from the dual port memory 110 is a second result signal, the first processor 120 recognizes that it cannot access the dual port memory 110 currently and retries the access later according thereto.

Additionally, when a result signal transmitted from the dual port memory 110 is a third result signal, the first processor 120 recognizes the third result signal as an access failure or access hold signal.

In order words, when the third result signal is received, the first processor 120 determines whether a predetermined allowance time elapses from a time point of requesting the access.

Then, if the predetermined allowance time elapses, the first processor 120 recognizes the third result signal as an access failure signal.

Additionally, if the predetermined allowance time does not elapse, the first processor 120 recognizes the third result signal as an access hold signal and according thereto, waits to receive a result signal re-transmitted from the dual port memory 110.

In order words, if the access is unavailable according to the access request, the first processor 120 waits until a predetermined allowance time to prepare a situation that an access result is changed.

In other words, at a time point that an access is requested from the first processor 120, the access of the first processor 120 may be unavailable by the access of the second processor 130. At this point, the access of the second processor 130 may be terminated within a predetermined allowance time.

Accordingly, according to the present invention, in preparing a situation that the access of the second processor 130 is terminated, by continuously maintaining an access request state of the first processor 120 during a predetermined allowance time, inconvenience in transmitting the access request again may be prevented.

Figure 7:
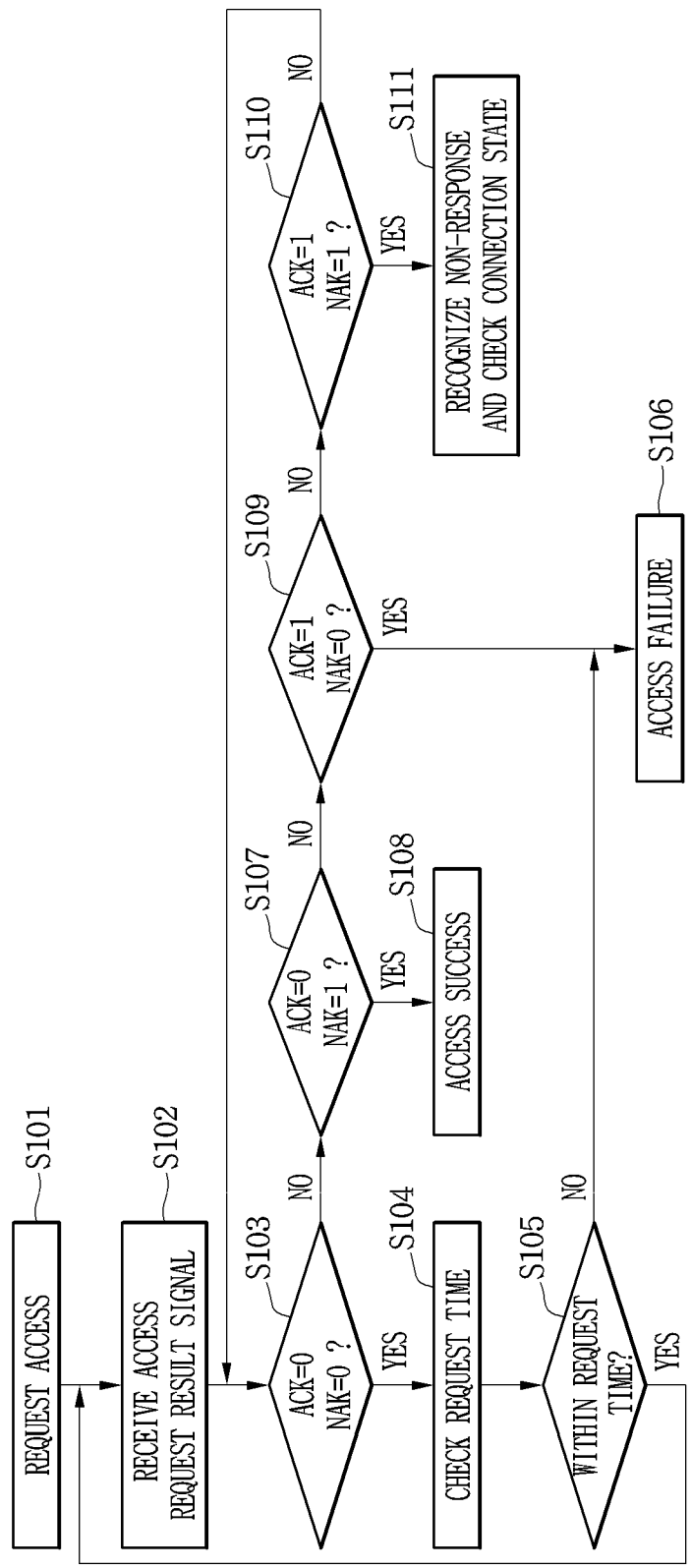
FIG. 7 is a flowchart illustrating an operation of a processor step by step in a dual port memory system according to a first embodiment of the present invention.
Figure 8:
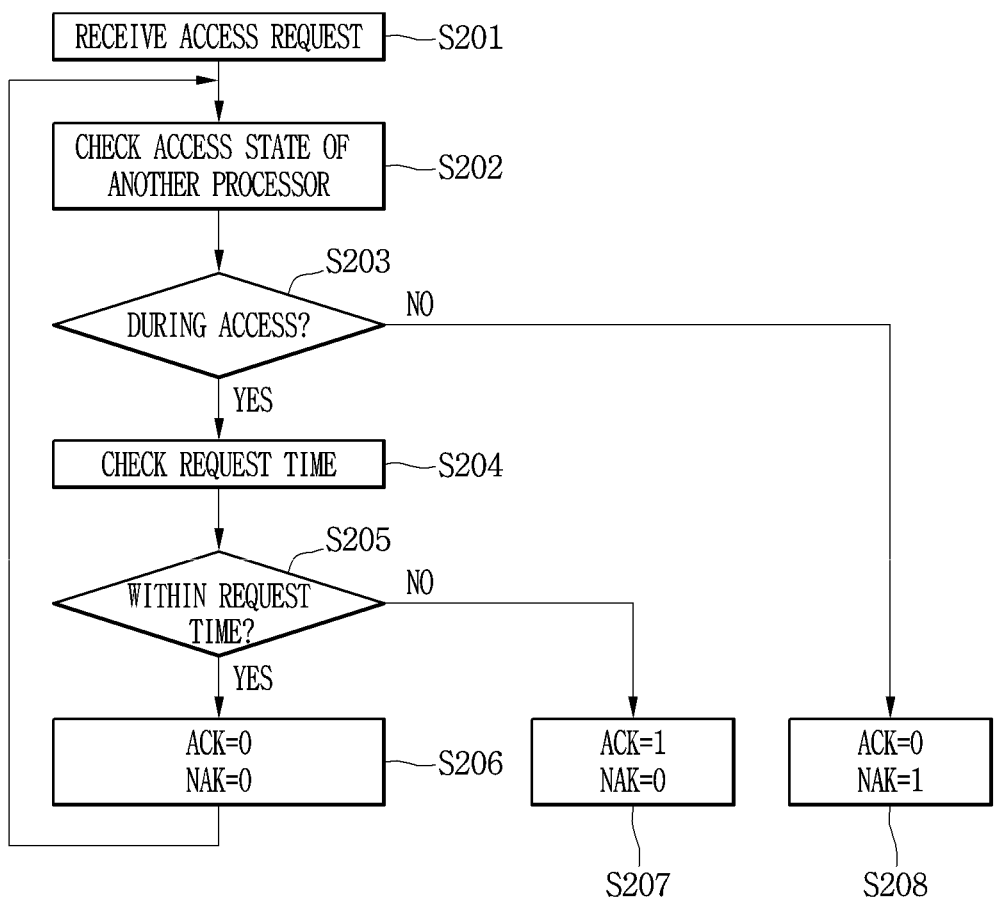
FIG. 8 is a flowchart illustrating an operation of a dual port memory step by step in a dual port memory system according to a first embodiment of the present invention.

FIG. 7 is a flowchart illustrating an operation of a processor step by step in a dual port memory system according to the first embodiment of the present invention. FIG. 8 is a flowchart illustrating an operation of a dual port memory in a dual port memory system according to an embodiment of the present invention.

Referring to FIG. 7, the first processor 120 may request access from a dual port memory 110 as the access is required.

Then, the first processor 120 receives a result signal according to the access request in operation 102.

The access result signal may include an ACK signal and NAK signal and a result according to the access request is determined by a combination of the ACK signal and the NAK signal.

The first processor 120 determines whether the received result signal is that both the ACK signal and the NAK signal are in a low state (a value of 0) in operation 103.

That is, the first processor 120 determines whether the result signal according to the access request is a third result signal for notifying access hold.

Then, if the received result signal is the third result signal, the first processor 120 checks a predetermined request time in operation 104 and according thereto, determines whether the predetermined request time elapses in operation 105.

Then, if the predetermined request time does not elapse, the first processor 120 returns to operation 102 to receive a result signal according to the access request again.

Additionally, if the predetermined request time elapses, the first processor 120 recognizes the third result signal as an access failure signal.

On the other hand, if the result signal according to the access request is not the third result signal, the first processor 120 determines whether the received result signal is that the ACK signal is low and the NAK signal is high in operation 107.

That is, the first processor 120 determines whether the result signal according to the access request is a first result signal for notifying access success.

Then, if the result signal according to the access request is the first result signal, the first processor 120 recognizes that access is allowed in operation 108.

On the other hand, if the result signal according to the access request is not the first result signal, the first processor 120 determines whether the received result signal is that the ACK signal is high and the NAK signal is low in operation 109.

That is, the first processor 120 determines whether the result signal according to the access request is a second result signal for notifying access failure.

Then, if the result signal according to the access request is the second result signal, the first processor 120 recognizes that access is rejected in operation 106.

Additionally, when the received result signal according to the access request is that the ACK signal and the NAK signal are in a high state corresponding to a no response state in operation 110, the first processor 120 checks a connection state with the dual port memory 110 to retry the access request in operation 111.

In the above-mentioned embodiment of the present invention, a predetermined allowance time is set and an access hold is allowed within the allowance time.

Referring to FIG. 8, the dual port memory 110 receives an access request signal from the first processor 120 in operation 201.

Then, the dual port memory 110 checks an access state of another processor (for example, a second processor) according to the access request.

Then, the dual port memory 110 determines whether the other processor is in access according to the checked access state in operation 203.

If the other process is in access currently, the dual port memory 110 checks a predetermined allowance time in operation 204.

Then, the dual port memory 110 determines whether the checked predetermined allowance time elapses in operation 205.

If the predetermined allowance time does not elapse on the basis of the determination result, the dual port memory 110 outputs a third result signal (both the ACK signal and the NAK signal are in a low state) in operation 206 or a second result signal (both the ACK signal and the NAK signal are in a high state) in operation 207.

Additionally, if the access of the other processor is not made, the dual port memory 110 outputs a first result signal (the ACK is in a low state and the NAK signal is in a high state) in operation 208.

At this point, if transmitting the third result signal, the dual port memory 110 checks the access termination of the other processor periodically and if the access is terminated, transmits a first result signal to the first processor 120 again.

Additionally, unlike this, if the allowance time elapses in a state that the access termination is not made, the dual port memory 110 transmits a second result signal to the first processor 120 again.

Figure 9:
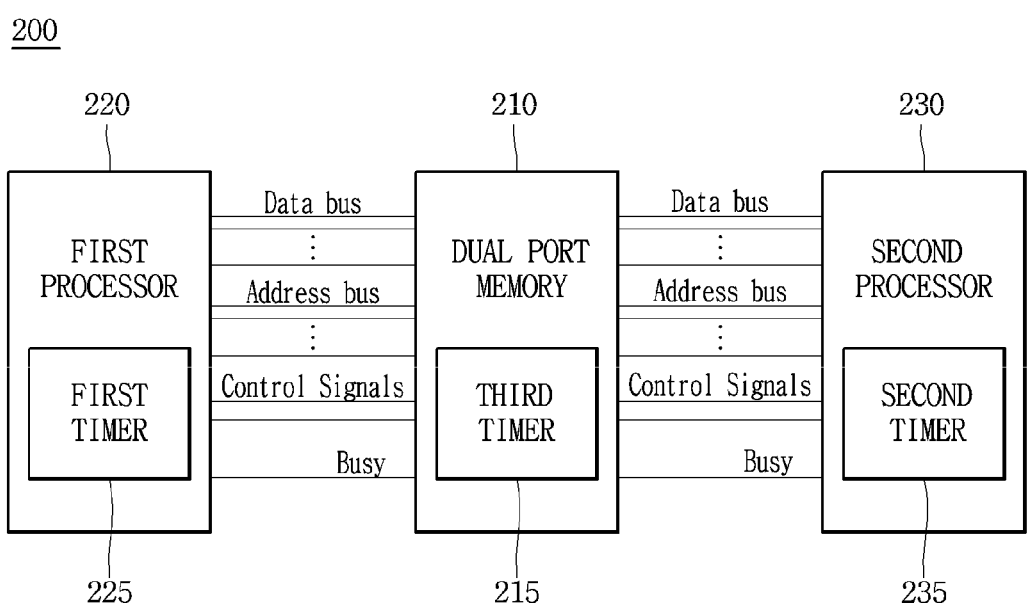
FIG. 9 is a view illustrating a configuration of a dual port memory system according to a second embodiment of the present invention.

FIG. 9 is a view illustrating a configuration of a dual port memory system according to a second embodiment of the present invention.

The dual port memory system according to the second embodiment of the present invention includes a dual port memory 210 including a third timer 215, a first processor 220 including a second timer 225, and a second processor 230 including a second timer 235.

Referring to FIG. 9, the dual port memory system has the same overall configuration as the dual port memory system shown in FIG. 3.

However, although the result signal according to the access result is transmitted through two lines according to the first embodiment of the present invention, a result signal according to an access request is transmitted through one line in the second embodiment.

The first line is a line where a busy signal is outputted from a general dual port memory system.

If there is an access request from the first processor 220, the dual port memory 210 checks whether the current another processor is in access and according thereto, outputs a busy signal representing an access rejection according to whether there is the access.

At this point, the busy signal may be used as a signal for notifying access failure or may be used as a signal for notifying access hold.

That is, if the other processor is in access, the dual port memory 210 determines whether a predetermined first allowance time elapses.

Herein, the first allowance time is a time set in the dual port memory 210 and may be set to a time such as 1 sec and 2 sec, for example.

Then, if the predetermined first allowance time elapses, the dual port memory 210 outputs a busy signal as a signal for notifying access failure.

Additionally, if the predetermined first allowance time does not elapse, the dual port memory 210 outputs a busy signal as a signal for notifying access hold.

At this point, if outputting a busy signal as a signal for notifying access hold, the dual port memory 210 checks the access termination of the other processor periodically and if the access is terminated, notifies access success to the first processor 220.

When requesting an access from the dual port memory 210 and an access success according to access allowance from the dual port memory 210 is recognized, the first processor 220 accesses the dual port memory 210 to perform a data reading or writing operation.

Additionally, the first processor 220 requests an access from the dual port memory 210 and if a busy signal according to access rejection is received from the dual port memory 210 accordingly thereto, the first processor 220 may identify whether the busy signal is a signal for access failure or a signal for notifying access standby.

Herein, the identifying of whether the busy signal is the signal for access failure or the signal for notifying access standby is performed according to whether a predetermined second allowance time elapses.

That is, when receiving the busy signal, the first processor 220 checks whether the predetermined second allowance time elapses. Then, if the predetermined second allowance time elapses, the first processor 220 recognizes the busy signal as an access failure signal. Additionally, if the predetermined second allowance time does not elapse, the first processor 220 recognizes the busy signal as an access standby signal and according thereto, waits to receive the result signal re-transmitted from the dual port memory 210.

Herein, the second allowance time is a time set in the first processor 220.

At this point, the first allowance time and the second allowance time may be identical to each other or unlike this, may be set to different times.

Figure 10:
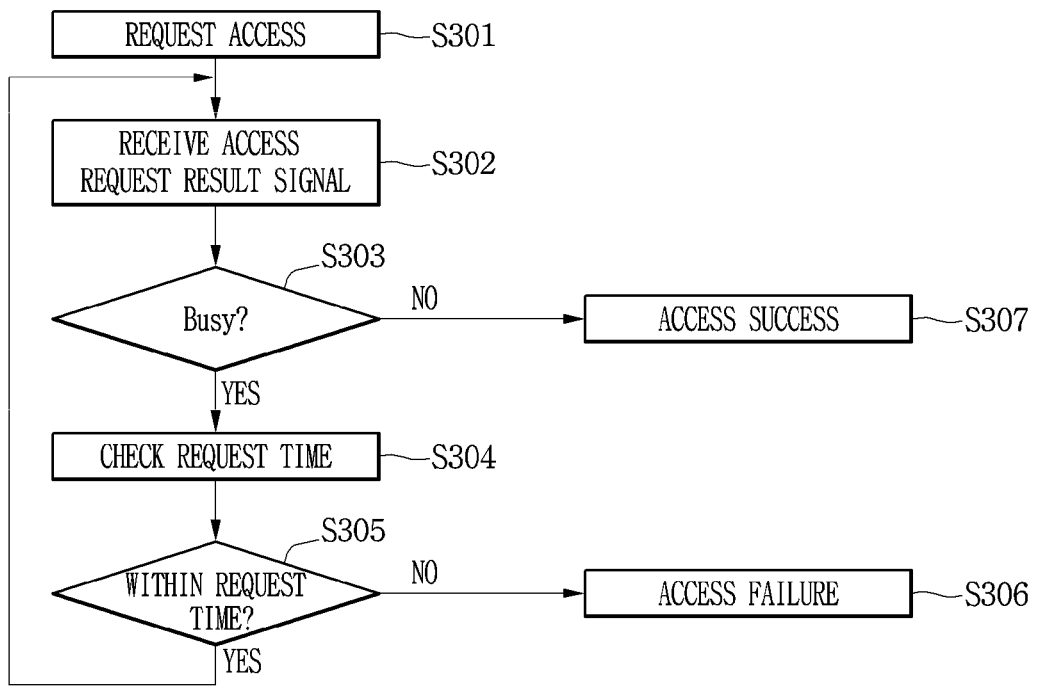
FIG. 10 is a flowchart illustrating an operation of a processor step by step in a dual port memory system according to a second embodiment of the present invention.

FIG. 10 is a flowchart illustrating an operation of a processor step by step in a dual port memory system according to a second embodiment of the present invention.

Referring to FIG. 10, the first processor 220 transmits an access request signal to the dual port memory 210 in operation 301.

Then, the first processor 220 receives an access result signal according to the access request signal in operation 302.

Then, the first processor 220 determines whether the received access request result signal is a busy signal in operation 303. That is, the first processor 220 determines whether a busy signal in low state is received.

That is, when receiving the busy signal, the first processor 220 checks a predetermined second allowance time in operation 304.

Then, the first processor 220 determines whether the checked second allowance time elapses in operation 305. That is, the first processor 220 determines whether the current time point is a time point that the second allowance time elapses on the basis of a time point of requesting the access.

Then, if the second allowance time does not elapse, the first processor 220 recognizes the busy signal as an access hold signal and according thereto, returns to operation 302. That is, if the busy signal is an access hold signal, the first processor 220 waits to receive a result signal changed according to whether the access of another processor is terminated from the dual port memory 210.

Additionally, if the second allowance time elapses, the first processor 220 recognizes the busy signal as an access failure in operation 306.

Additionally, if the busy signal is in a high state, as access is allowed, the first processor 220 recognizes that the access is successful in operation 307.

Figure 11:
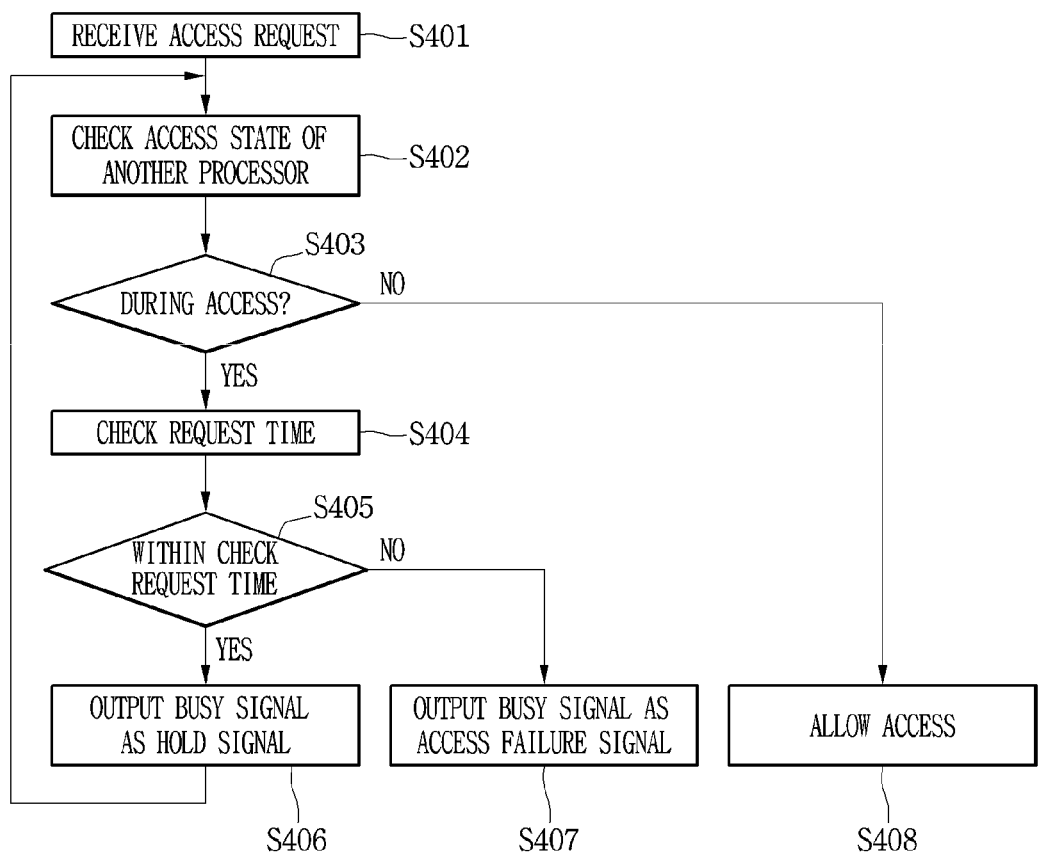
FIG. 11 is a flowchart illustrating an operation of a dual port memory step by step in a dual port memory system according to a second embodiment of the present invention.

FIG. 11 is a flowchart illustrating an operation of a dual port memory step by step in a dual port memory system according to a second embodiment of the present invention.

Referring to FIG. 11, the dual port memory 210 receives an access request signal transmitted from the first processor 220 in operation 401.

Then, as the access request signal is received, the dual port memory 210 determines whether the current another processor, that is, the second processor 230, is in access in operation 403.

That is, if the second processor 230 is in access on the basis of the determination result, the dual port memory 210 checks a predetermined first allowance time in operation 404.

Then, the dual port memory 210 determines whether the predetermined first allowance time elapses from a time point that the access is requested on the basis of the checked first allowance time in operation 405.

If the predetermined first allowance time does not elapse, the dual port memory 210 outputs a busy signal as an access hold signal in operation 406.

Additionally, if the predetermined first allowance time elapses, the dual port memory 210 outputs a busy signal as an access failure signal in operation 406.

Additionally, if the other processor is not in access, the dual port memory 210 allows the access of the first processor 220 in operation 408.

On the other hand, if the outputted busy signal is an access hold signal, the dual port memory 210 re-transmits a result signal to the first processor 220 according to whether the access of another processor in access currently is terminated.

In other words, if the access of the other processor is terminated, the dual port memory 210 allows the access of the first processor 220.

Additionally, if the access of the other processor is not terminated, the dual port memory 210 enters and performs operation 404 repeatedly.

According to an embodiment of the present invention, as a hold function using hardware is added through dual port interface logic, an access retrial process by an application is omitted so that an access retrial time may be reduced drastically and an optimized control may be performed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling access to a dual port memory system, the method comprising:
a first processor requesting access to a dual port memory; and
the dual port memory transmitting a result signal to the first processor in response to the access request,
wherein the result signal comprises a first indication of access success, a second indication of access failure, or a third indication of access standby,
wherein transmitting the result signal comprises:
transmitting an access allowance signal corresponding to the first indication; and
transmitting a busy signal corresponding to the second indication and third indication,
wherein the busy signal is recognized as the third indication until an allowance time elapses,
wherein the busy signal is recognized as the second indication after the allowance time elapses,
wherein the allowance time comprises a first allowance time set in the dual port memory and a second allowance time set in the first processor,
wherein the dual port memory transmits the busy signal indicating access failure or access standby based on the first allowance time; and
wherein the first processor recognizes the transmitted busy signal as indicating access failure or access standby based on the second allowance time.

2. The method of claim 1, wherein transmitting the result signal further comprises:
checking a state of a second processor;
transmitting the first indication to the first processor when the second processor is not in an access state;
checking whether the allowance time elapses when the second processor is in the access state; and
transmitting the second indication if the allowance time elapses and transmitting the third indication if the allowance time has not elapsed.

3. The method of claim 2, wherein transmitting the result signal further comprises:
checking whether access of the second processor is terminated when the third indication is transmitted; and re-transmitting the third indication according to the whether access of the second processor is terminated.

4. The method of claim 3, wherein transmitting the result signal further comprises re-transmitting the first indication when access of the second processor is terminated before the allowance time elapses.

5. The method of claim 1, wherein the first processor waits to receive a re-transmitted result signal from the dual port memory until the allowance time elapses when the third indication is received.

6. The method of claim 5, wherein the first processor recognizes the received third indication as an access failure corresponding to the second indication when the third indication is received and the allowance time elapses.

7. The method of claim 1, wherein the first, second and third indications are determined by high and low states of a first signal and a second signal transmitted from the dual port memory to the first processor.

8. A method of controlling access to a dual port memory system, the method comprising:
   a first processor requesting access to a dual port memory;
   the dual port memory checking an access state of a second processor;
   allowing access of the first processor when the second processor is not in an access state; and
   the dual port memory transmitting a busy signal to the first processor to indicate access failure when the second processor is in the access state,
   wherein the busy signal indicates access standby before a first allowance time elapses,
   wherein the busy signal indicates access failure after the first allowance time elapses,
   wherein the allowance time comprises a first allowance time set in the dual port memory and a second allowance time set in the first processor,
   wherein the dual port memory transmits the busy signal indicating access failure or access standby based on the first allowance time; and
   wherein the first processor recognizes the transmitted busy signal as indicating access failure or access standby based on the second allowance time.

9. The method of claim 8, wherein the dual port memory:
   checks whether access of the second processor is terminated when the transmitted busy signal indicates access standby;
   allows access of the first processor when access of the second processor is terminated; and
   re-transmits a busy signal according to whether the first allowance time elapses when access of the second processor is not terminated.

10. The control method of claim 8, wherein the first processor waits to receive a re-transmitted access result signal from the dual port memory until a second allowance time elapses when the busy signal indicating access standby is received.

* * * * *